United States Patent [19]

Brock et al.

[11] Patent Number: 4,587,157

[45] Date of Patent: May 6, 1986

[54] WEAR RESISTING UNDERCOAT FOR THIN FILM MAGNETIC RECORDING MEDIA

[75] Inventors: George W. Brock, Los Altos Hills; George J. Hampton, Belmont, both of Calif.

[73] Assignee: Verbatim Corp., Sunnyvale, Calif.

[21] Appl. No.: 436,285

[22] Filed: Oct. 25, 1982

[51] Int. Cl.$^4$ .............................................. G11B 5/72
[52] U.S. Cl. .................................. 428/216; 360/134; 360/135; 427/128; 427/131; 427/132; 428/336; 428/329; 428/422; 428/447; 428/694; 428/695; 428/900
[58] Field of Search ................. 427/132, 131; 428/694, 428/695, 693, 336, 216, 422, 447, 329; 360/134–136

[56] References Cited

U.S. PATENT DOCUMENTS

| | | | |
|---|---|---|---|
| 3,959,553 | 5/1976 | Hartmann | 428/402 |
| 4,075,384 | 2/1978 | Suzuki | 428/329 |
| 4,128,672 | 12/1978 | Wunsch | 427/132 |
| 4,183,976 | 1/1980 | Yamada | 427/131 |
| 4,188,434 | 2/1980 | Loran | 428/900 |
| 4,259,392 | 3/1981 | Suzuki | 428/694 |
| 4,275,113 | 6/1981 | Saito | 428/323 |
| 4,321,303 | 3/1982 | Morita | 428/404 |
| 4,328,935 | 5/1982 | Steel | 428/694 |

Primary Examiner—Ellis P. Robinson
Attorney, Agent, or Firm—Dennis P. Monteith

[57] ABSTRACT

A flexible magnetic recording media, such as disks or magnetic tape, having a non-magnetic layer intermediate the substrate and magnetic recording layers providing improved durability of the magnetic recording layer including a binder comprised of non-magnetic particles of $\alpha Fe_2O_3$ with similar physical properties as those of the magnetic recording layer ($\gamma Fe_2O_3$ or Co-$\gamma Fe_2O_3$) and a reservoir of lubricant.

14 Claims, 6 Drawing Figures

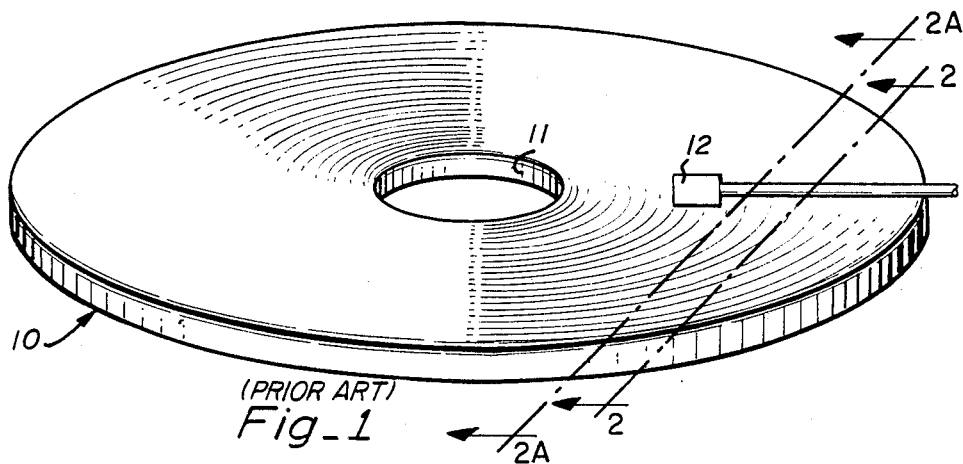
Fig_1 (PRIOR ART)
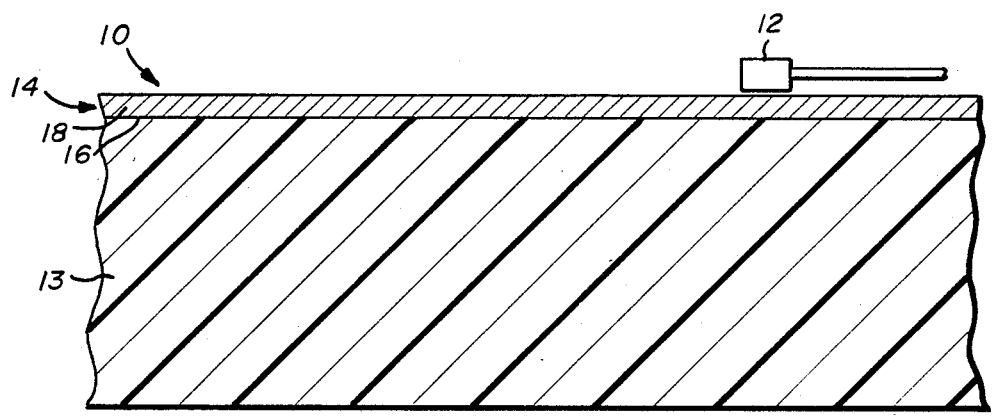
Fig_2 (PRIOR ART)
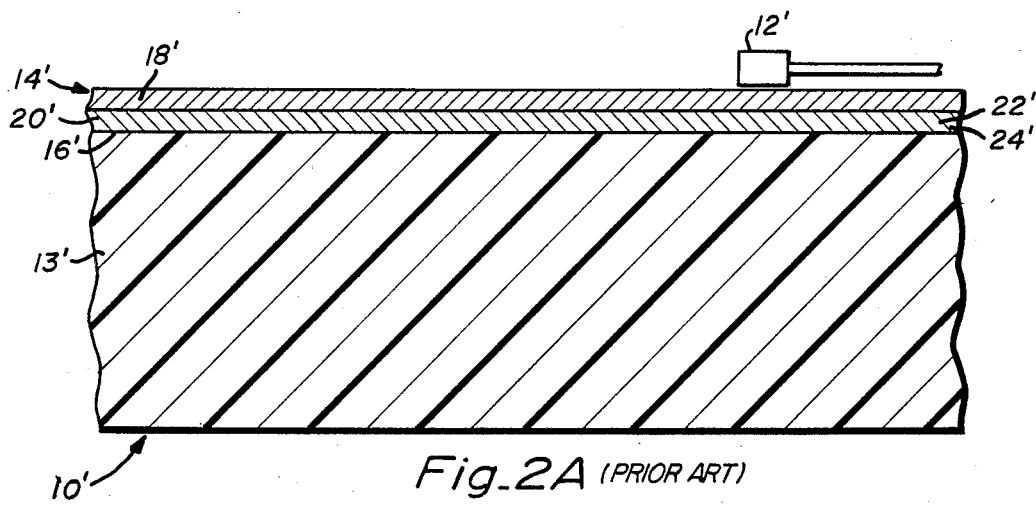
Fig_2A (PRIOR ART)

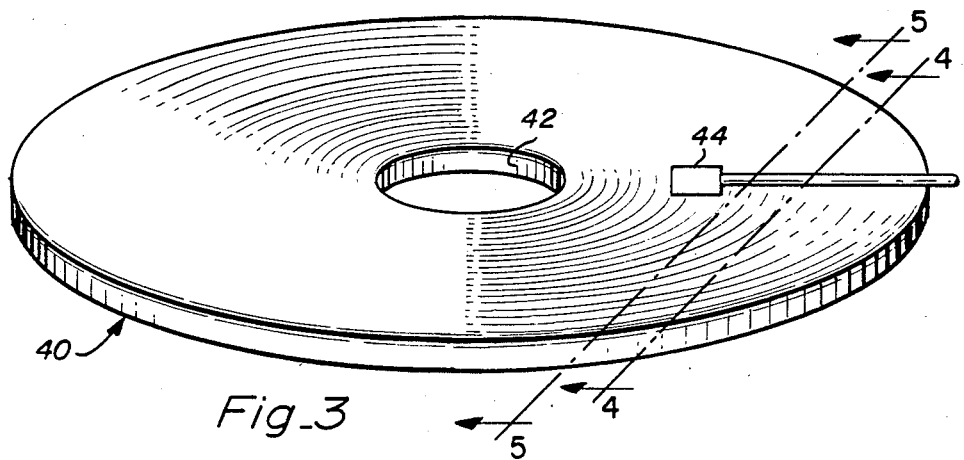
Fig_3
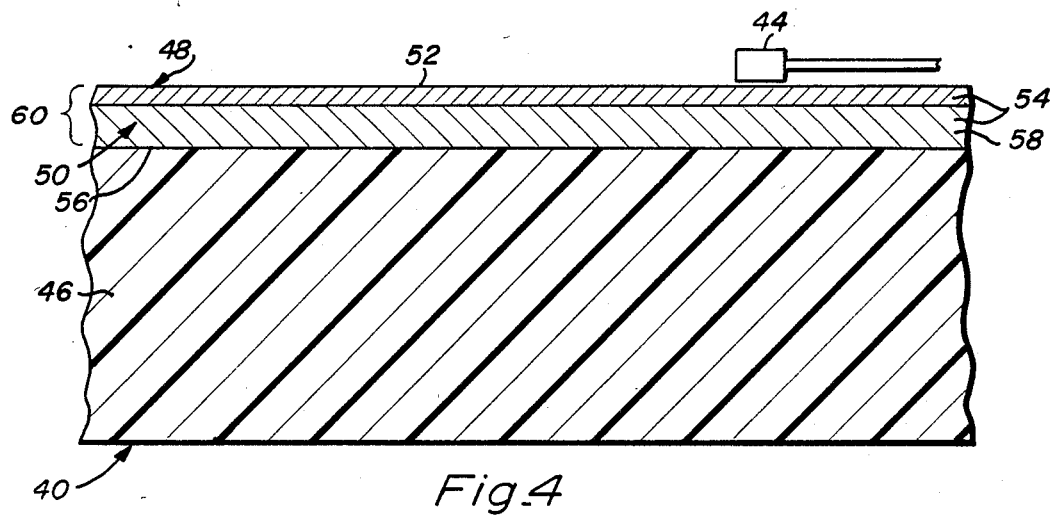
Fig_4
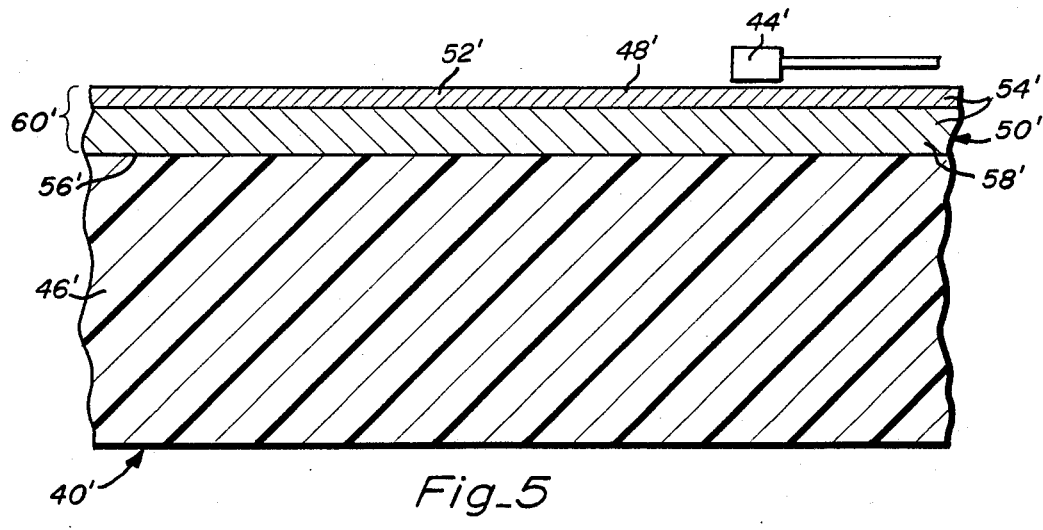
Fig_5

WEAR RESISTING UNDERCOAT FOR THIN FILM MAGNETIC RECORDING MEDIA

BACKGROUND OF THE INVENTION

1. Field of the Invention

The invention relates generally to flexible magnetic recording media and more particularly to flexible magnetic recording media having an improved porous undercoating film including particles of a non-magnetic oxide which imparts thick film properties to and increases the lubrication potential of the magnetic recording layer.

2. Description of the Prior Art

Magnetic media is commonly used to store and retrieve coded data. In the past, undercoating of the magnetic recording layer in the magnetic media has been carried out to coat over any non-uniformity of the base film substrate layer such as polyethylene tetrathalate. This is done to provide a good adhesion layer between the magnetic recording layer and the base film substrate layer, and to provide a conductive layer to reduce the potential for electrostatic problems. Today, the trend in magnetic media storage devices is toward higher bit densities to increase the data storage capacity. The most convenient way to achieve the higher bit densities is to increase the coercive force of the ferromagnetic iron oxide used in magnetic media. Since the magnetic field of the read-write head must saturate the higher coercive force magnetic media in order to properly switch the field, the thickness of the magnetic oxide must be reduced. Thus, magnetic recording layers of one micrometer thickness in flexible media and one-half micrometer thickness in rigid media are becoming common to solve this inherent problem.

However, thinner films have less durability and cohesive strength and are more prone to adhesion problems. The cause of lower durability is to some extent the influence of the substrate properties affecting the penetration hardness of the thin layer. The sudden change in elasticity of the materials used at the interface of the base film substrate layer and the magnetic recording layer reduces the durability of the recording layer. Thus, if a high durability substrate material is used, the magnetic layer will exhibit a higher level of durability than it otherwise would. Another major effect on durability of the thin magnetic recording layer is the quantity of lubricant that is available for lubricating the wear interface. These problems result in early magnetic recording layer failure.

Previous attempts to solve this durability problem which resulted in measurable increased wear resistance of the recording layer included the addition of hard additives to the magnetic oxide coating, the use of new materials to lubricate the recording layer, the choice of the particular magnetic oxide to be used to coat the recording layer, and a higher strength binder system that fuses the recording layer to the base film substrate layer. Additionally, in flexible media formulations, it is common practice to include lubricant in the magnetic coating formulation and/or to post coat the surfaces after coating. The lubricant is resident within the pores of the magnetic coating from which it is drawn to the surface as the surface lubricant is depleted during use. In particular, U.S. Pat. No. 3,959,553, issued to Hartmann, et al, discloses a process for manufacture of rigid magnetic disks which is especially suitable for manufacture of recording disks having very thin magnetic coatings. The magnetic disks can be manufactured very advantageously by coating a non-magnetic metallic base disk with a dispersion of a finely divided magnetic pigment in a solution of a binder in an organic solvent and converting the coating into a solid hard magnetic coating of predetermined hardness for recording if the non-magnetic metallic base disk, prior to application of the magnetic coating, is provided with a hard and polishable non-magnetic intermediate layer. This non-magnetic intermediate layer comprises a pulverulent mixture of finely divided inorganic non-magnetic pigments like $\alpha Fe_2O_3$ containing corundum powder having a particle size from one to twenty micrometers with a moh's hardness of at least seven or a finely divided cerium dioxide powder. Additionally, Hartmann discloses that acicular gamma-iron oxide may be employed as the magnetic pigments and that conventional small amounts of dispersing agents or lubricants may be used in the layers.

U.S. Pat. No. 3,996,095, issued to Ahn, et al, discloses a low temperature method of formation of magnetite $Fe_3O_4$ and $\gamma Fe_2O_3$ films on a substrate which is not a single crystal. The results produced are useful as magnetic recording media and magnetic recording head layers because of the extremely smooth and stable iron oxide and ferrite thin films which display desirable magnetic characteristics. Additionally, the process can be performed successfully at a temperature of 200° C. or less.

U.S. Pat. Nos. 4,075,384 and 4,259,392 issued to Suzuki, et al, and Suzuki, respectively, disclose inventions relating to multilayer magnetic recording media. In the '384 patent, Suzuki, et al discloses a magnetic recording tape comprising a non-magnetic support, a two-layered magnetic coating composed of a ferromagnetic powder and a binder formed on one surface of the support and in which the upper layer possesses a greater coercive force and dry thickness than the lower layer. Although multi-layered magnetic recording media have an actuating bias and equalization different from those of standard tapes and low noise tapes, Suzuki, et al discloses a multi-layered magnetic recording media with an actuating bias and equalization similar to those of a standard tape and a low noise tape and can be used in tape recorders not equipped with bias and equalization selectors. Also, the magnetic recording tape displays reduced head demagnetization and head wear. The '392 patent, discloses a multilayer magnetic recording media and dual-layer magnetic recording tape having improved magnetic recording properties and capable of providing the improved characteristics of a magnetic tape at a conventional bias and/or equalization position. Also, the dual-layer magnetic recording medium displays good linearity over broad frequency ranges and a broad dynamic range and good overall balance. The disclosure also provides for improved surface properties of a magnetic recording tape, the squareness ratio of the magnetic intensity (B) - flux density (H) characteristics and saturation property of the initial magnetization curve to redistribute the operation bias of the magnetic recording tape. Both Suzuki patents recite prior art disclosing magnetic coating composition and magnetic recording layers that may contain additives such as dispersants and lubricants.

U.S. Pat. No. 4,188,434 issued to Loran, discloses an invention relating to the use of solid and liquid lubricants. A magnetizable layer is fused to a substrate layer and then a solid and liquid lubricant layer is applied by dissolving the lubricants in a carrier solvent and then spraying the magnetic disk with the carrier. The solid lubricant is initially applied and buffed to a smooth layer and then the liquid lubricant is likewise applied.

U.S. Pat. 4,232,072 issued to Pardee, discloses an improved lubrication composition and method of its application to specified substrates. The improved wear-resistant, low-friction substrates have a coating provided by such composition and the substrates include sound and video recordings such as gramophone or phonographic records, video disks and the like. The composition is essentially comprised of carboxylate ester, tetrafluorethylene polymer, antistatic agent and a solvent.

U.S. Pat. No. 4,275,113, issued to Saito, et al, discloses a magnetic recording medium having a low surface resistivity of the magnetic layer with high quality electro-magnetic properties and adhesiveness between the magnetic layer and a carrier sheet. The structure enables one to avoid the problem of electrification of the recording medium and to maintain a good uniformity of the surface thereof, thereby enabling the suppression of electrostatic noise induced in the magnetic recording medium due to electrification. There is provided at least one intermediate layer with electrical conductivity between the magnetic layer and the carrier strip of the recording media. Carbon black, having a large specific surface area and a high oil absorption, is added as the conductive material in the intermediate layer. The particles of carbon black act as an electric conductive material to reduce the resistivity of the magnetic layer.

U.S. Pat. No. 4,321,303 issued to Morita, et al, discloses a magnetic powder for a magnetic recording medium having improved magnetic characteristics and obtained by forming a silica layer on the surface of an acicular iron oxide fine powder as a core by treating it with a silicon compound. The powder may be heat shrinked before preparing a cobalt modified acicular iron oxide fine powder. This occurs by dispensing the acicular iron oxide fine powder as the core in an aqueous solution of ammonia containing cobalt ions and treating it in an inert gas atmosphere at high temperature or in a reduction atmosphere. The acicular iron oxides used as the core can include hydrate type and can be $\gamma Fe_2O_3$ or $\alpha Fe_2O_3$. The result is a stable cobalt modified magnetic iron oxide.

Finally, U.S. Pat. No. 4,328,935 issued to Steel, discloses a magnetic recording tape having a non-magnetizable backside coating including smooth equant particles having a mohs hardness of at least seven. When the tape is used in a belt driven cartridge, the presence of the equant particles in the backside coating provides uniformity of tape speed. The equant particles of from 0.1 to 0.5 micrometers in average diameter are substantially free from sharp edges which reduces tape damage while on the reel.

In view of the prior art, the problem of flexible magnetic media durability still exists. With reference to the above recited prior art, some include an intermediate layer comprised of carbon, some include lubricants either in an overcoat of the magnetic medium or of the substrate, and some introduce hard ceramic particles as additives into the magnetic coating. However, none provide a satisfactory solution to the wear problem of thinner (1 micrometer) magnetic recording coatings.

SUMMARY OF THE PRESENT INVENTION

It is therefore an object of the present invention to provide a flexible magnetic recording media having a thin particulate magnetic recording coating with improved durability.

It is a further object to provide a flexible magnetic recording media having a recording coating with an intermediate layer between the magnetic recording layer and the base film substrate layer comprised of particles similar in composition, size, and dispersion as those of the magnetic recording layer imparting thick film properties to the composite magnetic recording - intermediate layers.

It is a further object to provide a flexible magnetic recording media having a lubricating undercoat that improves the durability of thin particulate magnetic oxide coatings relative to the durability provided by previously known methods.

It is a further object to provide a flexible magnetic recording media having a thin particulate magnetic recording coating with improved durability with a larger reservoir of lubricant resident within the magnetic coating from which it is drawn as needed.

It is a further object to provide a flexible magnetic recording media of diminished surface irregularity effects of the base film substrate surface to prevent compliance problems between the magnetic head and the $\gamma Fe_2O_3$ or Co-$\gamma Fe_2O_3$ magnetic recording layer.

Briefly, a preferred embodiment of the present invention includes a flexible magnetic recording media with a thin particulate oxide coating which exhibits improved wear resistance. A binder system is used to adhere a magnetic recording layer to a base film substrate layer. The binder incorporates ($\alpha Fe_2O_3$) non-magnetic particles which are similar in pigment weight concentration (PWC), size, and dispersion to the $\gamma Fe_2O_3$ or Co-$\gamma Fe_2O_3$ particles of the magnetic recording layer and thus forms a non-magnetic intermediate layer. Co-$\gamma Fe_2O_3$ refers to Cobalt doped gamma iron oxide. Since the intermediate layer is comprised of binder particles with similar physical properties as those of the magnetic recording layer, the magnetic layer exhibits a new dimension of hardness normally characteristic of thick film recording layers while possessing the advantages of a thin film recording layer.

A lubricant is added to increase the lubricity of the magnetic recording layer. The lubricant may be incorporated via an overcoat of a composite layer comprised of the magnetic layer and the intermediate layer or may be internally resident within each layer prior to the layers being physically adhered. The result is a dramatic improvement of the durability of thin particulate oxide coatings for flexible magnetic recording media.

An advantage of the present invention is that the durability of the thin particulate magnetic recording coating is improved.

Another advantage is that it provides a flexible magnetic recording media wherein the surface irregularity effects of the base film substrate surface are diminished thereby preventing compliance problems between the magnetic head and the $\gamma Fe_2O_3$ or Co-$\gamma Fe_2O_3$ magnetic recording layer.

These and other objects and advantages of the present invention will no doubt become obvious to those of ordinary skill in the art after having read the following detailed description of the preferred embodiment which are illustrated in the various drawing figures.

IN THE DRAWINGS

FIG. 1 is a perspective view of a thin film disk of the prior art;

FIG. 2 is a cross-sectional view of the thin film disk of FIG. 1 taken along the line 2—2;

FIG. 2A is a cross-sectional view of an alternative thin film disk of the prior art taken along the line 2A—2A of FIG. 1;

FIG. 3 is a perspective view of a thin film disk in accordance with the present invention;

FIG. 4 is a cross-sectional view of the thin film disk of FIG. 3 taken along the line 4—4 and illustrating the magnetic recording layer, the intermediate layer including the $\alpha Fe_2O_3$ particles, and the lubricant overcoat; and FIG. 5 is a cross-sectional view of an alternate embodiment of the thin film disk of the present invention taken along the line 5—5 of FIG. 3 and illustrating the magnetic recording layer, the intermediate layer including the $\alpha Fe_2O_3$ particles, and the lubricant.

DETAILED DESCRIPTION OF THE PREFERRED EMBODIMENTS

FIG. 1 illustrates a perspective view of a thin film floppy or rigid disk of the prior art, referred to by the general reference numeral 10, and showing a mounting aperture 11 and a sensing device 12. FIG. 2 illustrates a cross-sectional view of the disk 10 taken along line 2—2 of FIG. 1. The disk 10 includes a substrate layer 13 which is bonded to a magnetic layer 14 by a binder system 16. The magnetic layer 14 may also contain an additive 18 comprised of dispersants, lubricants, abrasives, or antistatic agents. The substrate layer 13 acts as a support layer and the magnetic layer 14 serves to store the data recorded.

As previously noted herein, in magnetic media, the magnetic layers such as the layer 14, are tending to be thinner to accommodate higher density data storage and thus are less durable. This lower durability of the magnetic layer 14 is influenced by the physical properties of the substrate layer 13 affecting the penetration hardness of the magnetic layer 14 and the distinctive difference in elasticity of the two layers at the binder system interface 16. Thus, as the thin film disk 10 is subjected to continuous wear by the external sensing device 12, the magnetic layer 14 becomes the most vulnerable element of the disk 10. Also, the quantity of the lubricant additive 18 available for lubricating the binder wear interface 16 affects the durability of disk 10. Thus, it is common, in flexible media technology, to include the lubricate additive 18 in the magnetic layer 14 and/or to post coat the surface of the magnetic layer 14.

FIG. 2A illustrates an alternative cross-sectional view of the thin film rigid disks 10' of the prior art taken along the line 2A—2A of FIG. 1 and referred to by the general reference numeral 10. In this alternative embodiment, an intermediate layer 20' is applied to the substrate layer 13'. Intermediate layer 20' consists of a dispersion of a pulverulent mixture of finely divided inorganic non-magnetic pigments 22' which provide firm cohesion of the pigment particles 22' to themselves and to the substrate layer 13'. The pigment mixture 22' of the intermediate layer 20' contains at least 3% by weight of corundum powder 24' having a particle size of from one to twenty micrometers. Again, conventional additives 18' such as dispersing agents or lubricants may be present in conventional small amounts.

FIG. 3 illustrates a perspective view of a thin film floppy disk referred to by the general reference numeral 40 and incorporating the present invention. The thin film disk 40 includes a mounting aperture 42 and is shown in magnetic communication with an external sensing device 44. Referring briefly to FIG. 4 there is illustrated a cross-sectional view of the thin film disk 40 taken along line 4—4 of FIG. 3. The thin film disk 40 includes a base film substrate layer 46 which is in mechanical communication with a magnetic recording layer 48 via an intermediate layer 50. The magnetic recording layer 48 is comprised of $\gamma Fe_2O_3$ particles 52, may contain additives 54 such as lubricants, and is in magnetic communication with the external sensing device 44. The intermediate layer 50 contains a binder 56, $\alpha Fe_2O_3$ particles 58 and may contain the aforementioned lubricant additives 54. The combination of the magnetic recording layer 48 and the intermediate layer 50 form a composite layer 60 for durability purposes.

The substrate layer 46 is comprised of polyethylene terephthalate and is used to support the data storage magnetic recording layer 48. Note, the magnetic recording layer 48 is approximately one micrometer in thickness and the $\gamma Fe_2O_3$ particles 52 contained therein are of smaller dimension. Since the magnetic recording layer 48 is the least durable component of the thin film disk 40, the intermediate layer 50 has been designed to extend its resistance to wear. When a thin film of magnetic recording material 48 is in direct mechanical contact with a comparatively thick substrate layer 46, the thin film layer 48 tends to wear more rapidly. This is because the difference in the mechanical properties and the change in elasticity at the interface of the two layers caused by the adhesion of the binder 56 results in stress, fatigue and the ultimate failure of the magnetic recording layer 48. In the instant structure, the durability of the magnetic recording layer 48 is dramatically increased by incorporating into the binder 56 the $\alpha Fe_2O_3$ particles 58 which contribute to form the intermediate layer 50. Although $\alpha Fe_2O_3$ particles 58 have previously been partially utilized in an intermediate layer 20 on rigid disks as disclosed by Hartman et al in FIG. 2A of the instant application, the use of $\alpha Fe_2O_3$ particles 58 alone of similar pigment weight concentration, size, and dispersion as those particles used in the magnetic recording layer 48 has not been heretofore anticipated in flexible media technology. When the intermediate layer 50 is comprised of particles of similar physical properties, size and dispersion as those of the magnetic recording layer 48, the two layers combine to act as the composite layer 60. Thus, when materials of similar physical properties are stacked in layers, the composite whole acts as a singular material and the individual layers experience less wear when under stress than do materials of dissimilar properties. Therefore, the composite layer 60 exhibits the properties of a thick film with improved durability but possesses the advantages of high density thin film because the magnetic recording layer 48 is still only one micrometer thick.

A further aspect of the instant invention relates to the additives 54 included within the magnetic recording layer 48 and intermediate layer 50. Although the prior art disclosed that additives could be included in the magnetic layer, they were limited ro conventional small amounts. The addition of the intermediate layer 50 as shown on FIG. 4 creates the composite layer 60 and provides a greater volume for addition of lubricant 54. Thus, a porous undercoat containing lubricant additives 54 improves the lubrication potential of the magnetic recording layer 48 by providing a larger reservoir of lubricant. However, the lubricant additive 54 can be incorporated into the composite layer 60 by various methods. In the preferred embodiment, the intermediate layer 50 is coated with a thin magnetic recording layer 48 and then this composite layer 60 is overcoated with the lubricant additive 54, which is a material selected from the group consisting of esters, hydrocarbon oils, fatty acids, fluorocarbons, and silicones. This increased reservoir of lubricant improves the durability of the magnetic recording layer 48.

A further dimension of wear resistance and surface perfection is imparted to the magnetic recording layer 48 by a burnishing procedure performed upon the intermediate layer 50. After the substrate layer 46 has been coated by the binder 56 and $\alpha Fe_2O_3$ particles 58, the resulting intermediate layer 50 is passed over rotating blades to remove irregularities prior to the application of the magnetic recording layer 48. The resulting polished surface of the intermediate layer 50 in combination with the $\alpha Fe_2O_3$ particles 58 of similar pigment weight concentration, size, and dispersion as the particles of the magnetic recording layer 48 further improves the durability of the thin film disk 40.

As noted previously, the substrate layer 46 is comprised of polyethylene terephthalate which may have surface irregularities which are detectable by the external sensing device 44 through the thin magnetic recording layer 48. The use of a single gap head results in failure of the sensing device 44 to comply with the recorded data being deposited onto or read off of the magnetic recording layer 48. The addition of the intermediate layer 50 with $\alpha Fe_2O_3$ particles 58 between the substrate layer 46 and the magnetic recording layer 48 tends to diminish the surface irregularity effects of the substrate layer 46. Therefore, compliance problems between the external sensing device 44 and the magnetic recording layer 48 are prevented, thus increasing the reliability of the magnetic media.

The above disclosed preferred embodiment of the present invention is applicable to all flexible magnetic recording media such as flexible disks and magnetic tapes.

FIG. 5 discloses an alternative embodiment of the present invention referred to by general reference numeral 40' and illustrating a cross-sectional view of the thin film disk 40 taken along line 5—5 of FIG. 3. The components of thin film disk 40' are identical to those of the preferred embodiment 40 of FIG. 4. Those components include a base film substrate layer 46' which is in mechanical communication with a magnetic recording layer 48' via an intermediate layer 50'. The magnetic recording layer 48' is comprised of $\gamma Fe_2O_3$ or Co-$\gamma Fe_2O_3$ particles 52', may contain an additive 54' such as lubricants, and is in magnetic communication with the external sensing device 44'. The intermediate layer 50' contains a binder 56' comprised of $\alpha Fe_2O_3$ particles 58' and may contain the aforementioned lubricant additive 54'. The combination of the magnetic recording layer 48' and the intermediate layer 50' form a composite layer 60' for durability purposes.

The operation of the alternative embodiment 40' is duplicate to the embodiment 40 except with regard to the additives 54' included within the magnetic recording layer 48' and intermediate layer 50'. Again, the composite layer 60' provides a greater surface area for storage of the lubricant additive 54'. Thus, the porous undercoat of lubricant additive 54' improves the lubrication potential of the magnetic recording layer 48' by again providing a larger reservoir of lubricant. In the embodiment 40', the substrate layer 46' is comprised of the binder 56', the $\alpha Fe_2O_3$ particles 58', and the lubricant additive 54' to form the intermediate layer 50'. Then the intermediate layer 50' is coated with the magnetic recording layer 48' which includes additional lubricant additive 54'. Again, this increased reservoir of lubricant improves the durability of the magnetic recording layer 48' beyond prior attempts to improve durability by use of lubricant additives 54'. The burnishing procedure and remedy to single gap head compliance problems remain as described in connection with the embodiment 40.

Tests were conducted upon the thin film disks of the prior art 10, of the embodiment 40, and of the embodiment 40'. The test conducted is known in the industry as the single track wear test. Briefly, the test includes securing a flexible disk 40 to a rotating member of a test apparatus (not shown). The test apparatus includes the external sensing device 44 as described in connection with the embodiment 40. The flexible disk 40 is rotated at a fixed speed and is in physical contact with the external sensing device 44 which is held stationary for test procedures. The rotational velocity of the flexible disk 40 in revolutions per unit time is known. Thus, by determining the time it takes for the external sensing device 44 to wear through to the intermediate layer 50 coating, the revolutions to failure may be calculated. In the first test, the substrate layer 46 comprised of polyethelene terephthalate was coated with the oxide of the magnetic recording layer 48 including the lubricant additive 54. The magnetic recording layer 48 was one micrometer thick and was subjected to the test procedure above. After ten million revolutions, the magnetic recording layer coating 48 failed demonstrating the durability of the prior art disks 10. Next, the embodiment 40 and the embodiment 40' were tested. Again, a substrate layer 46 comprised of polyethylene terephthalate was utilized. In the embodiment 40, the substrate layer 46 was coated with the intermediate layer 50 of five micrometers thickness which included the binder 56 and $\alpha Fe_2O_3$ particles 58 without lubricant. Then the magnetic recording layer 48 comprised of one micrometer of magnetic oxide was coated over the intermediate layer 50 forming the composite layer 60. The final step included overcoating the composite layer 60 with lubricant additive 54. Then, in the embodiment 40', the substrate layer 46' was again coated with the intermediate layer 50' of a thickness of approximately one to ten micrometers. In this embodiment, the intermediate layer included the binder 56', the $\alpha Fe_2O_3$ particles 58', and lubricant additive 54'. Finally, the magnetic recording layer 48' comprised of from one-half to two micrometers of magnetic oxide with lubricant additive 54' was coated over the intermediate layer 50' to form the composite layer 60'. Both embodiments were subjected to the single track wear test procedure as described above. After one-hundred million revolutions, the magnetic recording layer coatings 48 and 48' of the embodiments 40 and 40', respectively, had not experienced a failure and continued to exhibit acceptable wear resistance. Note that these test results exhibit at least a 1000% improvement in durability over the prior art disks 10.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A flexible magnetic recording media comprising:
   a base film substrate layer;
   a magnetic recording layer comprising a plurality of particles of a magnetic oxide coated over the base film substrate layer for magnetically communicating with external sensing devices; and
   an intermediate layer comprising a plurality of particles of a non-magnetic oxide situated intermediate the base film substrate layer and the magnetic recording layer, said plurality of particles of non-magnetic oxide being of similar size, dispersion and weight concentration and possessing similar physical properties to those of said plurality of particles of magnetic oxide in the magnetic recording layer, the intermediate layer being a porous reservoir of lubricant for providing increased lubrication potential to the magnetic recording layer, the intermediate layer being in physical communication with the magnetic recording layer forming a composite layer, said composite layer being overcoated with a lubricant and in mechanical communication with the base film substrate layer, and said composite layer providing an added dimension of hardness to the magnetic recording layer and a reservoir of lubrication for the magnetic recording layer.

2. The flexible magnetic recording media of claim 1 wherein,
   the intermediate layer positioned intermediate the magnetic recording layer and the base film substrate layer acts to diminish surface irregularity effects of the base film substrate layer, for providing avoidance of compliance errors between the magnetic recording layer and said external sensing devices.

3. The flexible magnetic recording media of claim 1 wherein,
   said non-magnetic particles and said reservoir of lubrication are incorporated within a binder to form the intermediate layer for providing greater durability of the magnetic recording layer.

4. The flexible magnetic recording media of claim 1 wherein,
   the intermediate layer is approximately five micrometers in thickness and comprises $\alpha Fe_2O_3$.

5. The flexible magnetic recording media of claim 1 wherein,
   the magnetic recording layer is approximately one micrometer in thickness and is a particle layer selected from the group consisting of $\gamma Fe_2O_3$ and $Co-\gamma Fe_2O_3$.

6. The flexible magnetic recording media of claim 1 wherein,
   the lubricant that overcoats the composite layer is a material selected from the group consisting of esters, hydrocarbon oils fluorocarbons, fatty acids, and silicones.

7. The flexible magnetic recording media of claim 1 wherein;
   the surface of the intermediate layer is burnished for removing the irregularities on the surface prior to application of the magnetic recording layer.

8. A flexible magnetic recording media comprising:
   a base film substrate layer;
   a magnetic recording layer comprising a plurality of particles of a magnetic oxide and a lubricant coated over the base film substrate layer for magnetically communicating with external sensing devices; and
   an intermediate layer comprising a plurality of particles of a non-magnetic oxide and a lubricant situated intermediate the base film substrate layer and the magnetic recording layer, said particles of non-magnetic oxide being of similar size, dispersion, and weight concentration and possessing similar physical properties to those of said plurality of particles of magnetic oxide in the magnetic recording layer, the intermediate layer being a porous reservoir of lubricant for providing increased lubrication potential to the magnetic recording layer, the lubricant containing intermediate layer being in physical communication with the lubricant containing magnetic recording layer, and the intermediate layer and the recording layer together forming a composite layer, said composite layer being in mechanical communication with the base film substrate layer and providing an added dimension of hardness to the magnetic recording layer and a reservoir of lubrication for the magnetic recording layer.

9. The flexible magnetic recording media of claim 8 wherein,
   the intermediate layer positioned intermediate the magnetic recording layer and the base film substrate layer acts to diminish surface irregularity effects of the base film substrate layer for providing avoidance of compliance errors between the magnetic recording layer and said external sensing devices.

10. The flexible magnetic recording media of claim 8 wherein,
    said non-magnetic particles and said reservoir of lubrication are incorporated within a binder to form the intermediate layer for providing greater durability of the magnetic recording layer.

11. The flexible magnetic recording media of claim 8 wherein,
    the intermediate layer is of a thickness of approximately one-to-ten micrometers and comprises $\alpha Fe_2O_3$.

12. The flexible magnetic recording media of claim 8 wherein,
    the magnetic recording layer is of a thickness of approximately one-half to two micrometers and is a particle layer selected from the group consisting of $\gamma Fe_2O_3$ and $Co-\gamma Fe_2O_3$.

13. The flexible magnetic recording media of claim 8 wherein,
    the lubricant resident in the composite layers is a material selected from the group consisting of esters, hydrocarbon oils, fluorocarbons, fatty acids, and silicones.

14. The flexible magnetic recording media of claim 8 wherein,
    the surface of the intermediate layer is burnished for removing the irregularities on the surface prior to application of the magnetic recording layer.

* * * * *